No. 707,627. Patented Aug. 26, 1902.
C. OLSTED.
APPARATUS FOR COMBUSTION OF FUEL.
(Application filed Oct. 26, 1901.)
(No Model.) 2 Sheets—Sheet 1.
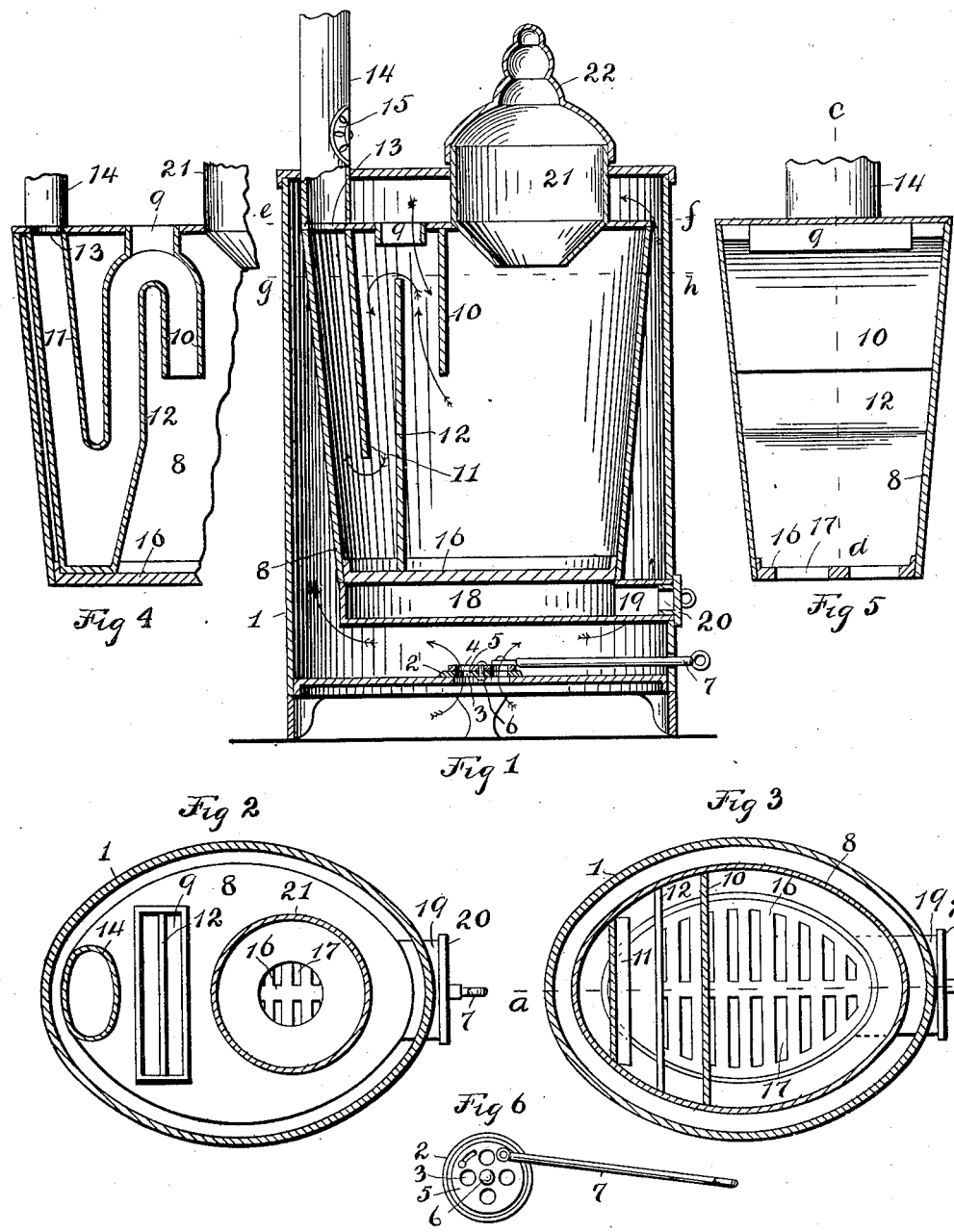

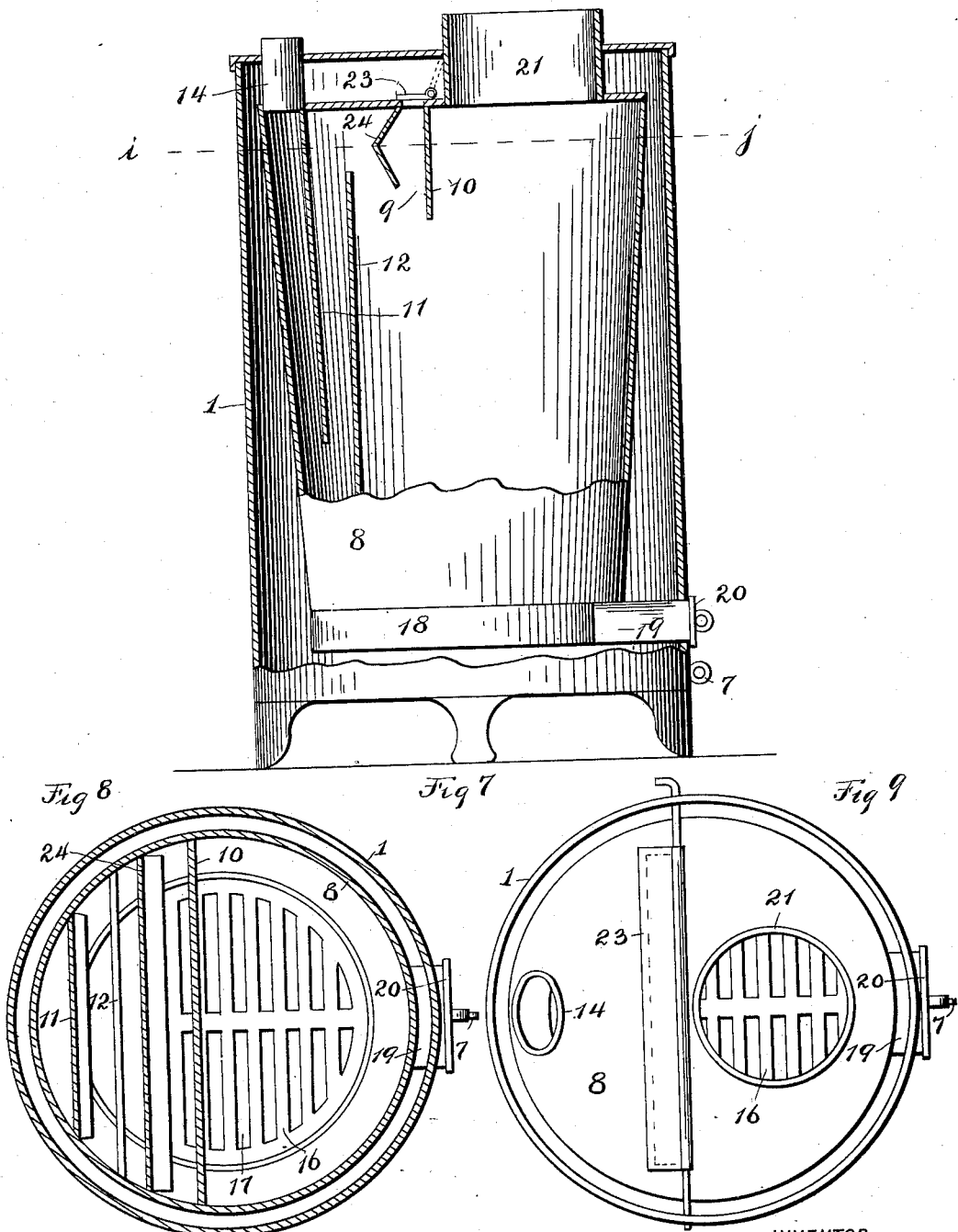

UNITED STATES PATENT OFFICE.

CHRISTIAN OLSTED, OF WYANDOTTE COUNTY, KANSAS, ASSIGNOR TO EDWARD HAREN, OF KANSAS CITY, KANSAS.

APPARATUS FOR COMBUSTION OF FUEL.

SPECIFICATION forming part of Letters Patent No. 707,627, dated August 26, 1902.

Application filed October 26, 1901. Serial No. 80,078. (No model.)

*To all whom it may concern:*

Be it known that I, CHRISTIAN OLSTED, a citizen of the United States of America, residing near Kansas City, in the county of Wyandotte and State of Kansas, have invented a new and useful Improvement in Apparatuses for Combustion of Fuel, of which the following is a specification, reference being had therein to the accompanying drawings, forming a part thereof.

My invention relates to improvements in apparatuses for combustion of fuel.

It relates particularly to an apparatus designed for heating purposes and may be applied to heating-stoves, boiler and heating furnaces, and other kinds of heating devices of a similar character.

The object of my invention is to provide an apparatus that may be cheaply constructed, efficient in its operation, and adapted to the use of different kinds of fuel.

My invention comprises certain novel features of construction, hereinafter fully described and claimed.

In the accompanying drawings, which illustrate my invention applied to heating-stoves, Figure 1 is a vertical sectional view taken on the dotted line $ab$ of Fig. 3. Fig. 2 is a horizontal sectional view taken on the dotted line $ef$ of Fig. 1. Fig. 3 is a similar view taken on the dotted line $gh$ of Fig. 1. Fig. 4 is a vertical sectional view taken on the dotted line $cd$ of Fig. 5, showing a modified form of a portion of my invention. Fig. 5 is a view taken at right angles to that shown in Fig. 4, the casing being shown in vertical section and the gas-passage in elevation. Fig. 6 is a plan view of the register mechanism. Fig. 7 illustrates my invention applied to a cylindrical stove, the view being partly in elevation and partly in vertical section. Fig. 8 is a horizontal sectional view taken on the dotted line $ij$ of Fig. 7. Fig. 9 is a top view of the form shown in Fig. 7, the top of the casing being removed.

Similar characters of reference indicate similar parts.

1 indicates the outer casing, which may be of any desirable form. In Figs. 1, 2, and 3 this form is shown as being elliptical. In Figs. 7, 8, and 9 it is shown as cylindrical. The bottom end of the casing is provided with an opening, over which is secured the lower register of ordinary construction, having a stationary disk 2, provided with openings 3, adapted to register with openings 4, provided in the rotatable horizontal disk 5, which is pivoted by a pin 6 to the disk 2. An operating-rod 7 is pivoted at its inner end to the disk 5 and has its outer end projecting through the casing 1. By reciprocating the rod 7 forward and backward the holes 3 and 4 may be moved into or out of register with each other. Within the casing 1 is an inner casing 8 of any desirable form and which forms with the outer casing a hot-air chamber. In the upper end of the casing 8 is an air-inlet opening 9. Upon each side of the air-inlet 9 is located a partition, (indicated by 10 and 11,) which extends across the casing and downwardly toward but not to the bottom thereof. From the bottom of the casing 8 upwardly extends a transverse partition 12, located between the partitions 10 and 11 and forming with the said partitions on each side of the partition 12 a passage for the gases made during combustion. This passage is continued to the left of the partition 11 and discharges into a discharge-opening 13, to which is fitted a discharge-pipe 14, which extends vertically through the outer casing 1, and may be provided outside the casing 1 with a check-draft damper 15 of common construction. The bottom of the casing 8 (indicated by 16) to the right of the partition 12 is provided with slots or perforations 17, through which the ashes may fall into an ash-receiving chamber 18, provided with an ash-discharge passage 19, which extends horizontally through the casing 1 and is provided at its outer end with a closure or cover 20. Through the upper ends of the inner and outer casings extends a vertical fuel-supply passage 21, provided at its upper end with a closure or cover 22. The lower end of this passage may be made converging, as shown in Fig. 1; but this is not essential. A damper 23 (shown in Figs. 7 and 9) may be used to close the air-inlet opening 9. When this is used, it is not so essential that the outer casing-joints be made so tight as in cases where the damper 23 is dispensed with. In Fig. 7 I have shown the air-inlet opening 9 nearer the center of the casing 8 than as shown in Fig. 1; but the operation of both are substantially the same. In the form shown in Fig. 7 the partition 10 forms one side of the air-inlet passage 9, and the left side 24 of the said passage is bent to the left in order to facilitate the mixture of the air and gases.

In Figs. 4 and 5 is shown a modified form of gas-passage. In this form the partition 10 is so curved as to connect with the air-inlet passage 9, the left wall of which extends downward and connects with the lower end of the partition 11. The upper end of the partition 12 in this modification is formed into a return-bend, so as to parallel at this end the partition 10. The partition 12 in all forms of the invention divides the casing 8 into two principal chambers, the chamber to the right thereof forming the combustion or fuel chamber and the chamber to the left forming an auxiliary combustion-chamber. An important feature of all forms of my invention is the placing of the air-inlet adjacent to the upper end of the partition 12, so that a portion of the air admitted may pass to the right of the partition and keep up combustion in the fuel-chamber, and a portion of the air admitted through the air-inlet passage 9 may pass to the left of the partition 12 over the top thereof, and thus provide a sufficient quantity of oxygen to complete the combustion first commenced in the fuel-chamber.

My invention is operated as follows: Fuel is first placed through the passage 21 into the fuel-chamber, where it rests upon the perforated bottom of the casing 8. It is then ignited, and the cover 22 is applied. The draft-openings in the bottom of the outer casing are then closed by operating the rod 7, and the cap 20 is removed so as to admit air through the passage 19, the ash-chamber 18, and the perforated bottom 16. When combustion is fairly started, the cap 20 is replaced and the draft-openings in the bottom of the outer casing and the damper 23 are opened, thus admitting air through the air-passage 9. A portion of the air so admitted will pass into the combustion-chamber and a portion will be drawn by the draft of the flue over the top of the partition 12. The mixed gas and air in the fuel-chamber will pass by the air-inlet passage 9 and over the top of the partition 12, thence downward around the lower end of the partition 11 and thence up and out of the chimney. The mixed gas and air to the left of the partition 12 will mingle with the portion of fresh air and complete combustion of the uncombined carbon will result, this end being facilitated by proximity of the combining elements with the hot partition 12.

My invention is capable of many modifications other than what is herein shown without departing from the spirit of my invention.

Having thus described my invention, what I claim, and desire to secure by Letters Patent, is—

1. The combination with an outer casing provided in the lower end with a draft-opening, of an inner casing provided at its lower end with an ash-receiving chamber, having a discharge-passage leading through the outer casing, a closure for said discharge-opening, a grate in the inner casing above the ash-receiving chamber, a fuel-passage leading through the outer and inner casings, an air-inlet and a gas-discharge passage in the upper end of the inner casing, two transverse partitions one on each side of the said air-inlet and extending downward toward the bottom of the inner casing, and a transverse partition located between the said two partitions and extending upward from the bottom of the inner casing to a point below the top thereof and above the lower ends of the said two partitions, substantially as described.

2. The combination with an outer casing provided with a draft-opening, of an inner casing, a fuel-supply passage leading through the two casings, a closure for the said passage, an air-inlet opening in the upper end of the inner casing, and a gas-passage leading past the said air-inlet and thence downward and thence upward to the exterior of the inner casing, substantially as described.

3. The combination with an outer casing provided with a draft-opening, of a register controlling the said draft-opening, an inner casing, a fuel-supply passage leading through the two casings, a closure for the said passage, an air-inlet opening in the upper end of the inner casing, and a gas-passage leading past the said inlet-opening and thence downward and thence upward through the exterior of the inner casing, substantially as described.

4. The combination with an outer casing provided with a draft-inlet opening, of a register controlling the said draft-opening, an inner casing provided in the upper end with an air-inlet and provided at the lower end with a passage for the removal of ashes, an upwardly-extending partition in the inner casing located below the said air-inlet, a horizontal partition located above the said ash-passage and at the lower end of the said partition and having perforations at one side of the said partition but imperforate on the other side thereof, and a gas-passage leading past the upwardly-extending partition and past the said air-inlet and thence downward and thence upward to the exterior of the inner casing, substantially as described.

5. The combination with an outer casing provided with a draft-inlet opening, of a register controlling the said inlet-opening, an inner casing having two chambers and an air-inlet discharging into both chambers, an opening connecting the two chambers adjacent to the air-inlet, a discharge-opening leading from one of the chambers, and two partitions, one in each chamber extending downward from the upper end of the casing below the opening connecting the two chambers, substantially as described.

6. The combination with an outer casing provided with a draft-inlet opening, of an inner casing provided with two chambers, an opening connecting the two chambers, an air-inlet opening discharging into the two chambers across the said connecting-opening, a discharge-opening leading through the inner casing from one of the chambers, the chamber having the discharge-opening being provided with an imperforate bottom and the other chamber having a perforated bottom, a closed ash-receiving chamber located below the perforated bottom of the said chamber and provided with a passage for the discharge of ashes, and a closure for the said ash-discharge passage, substantially as described.

7. The combination with an outer casing provided with a draft-inlet opening, of a register controlling the said opening, an inner casing provided with two chambers, an opening connecting the two chambers, an air-inlet discharging into the said connecting-opening, a fuel-supply opening leading through the inner casing into one of the said chambers, a discharge-opening leading through the inner casing from the other chamber, the chamber having the discharge-opening being provided with an imperforate bottom, the chamber having the fuel-supply passage being provided with a perforated bottom, an ash-receiving chamber placed so as to receive ashes through the said perforations and having an ash-discharge passage leading therefrom, a closure for the said ash-discharge passage, and a closure for the fuel-supply passage, substantially as described.

8. The combination with a casing provided with two chambers having an opening connecting them, two partitions, one in each chamber, extending downward from the upper end of the casing past the said connecting-opening, an air-inlet between the said two partitions, an outlet-opening leading from one of said chambers, the chamber having the outlet-opening being provided with an imperforate bottom and the other chamber having a perforated bottom, of an ash-receiving chamber located below the perforated bottom of the said chamber and having an ash-discharge opening leading therefrom, substantially as described.

9. A combustion-chamber provided with an air-inlet opening in the upper end, two downwardly-extending partitions located one on each side of the said air-inlet opening, a partition extending upwardly from the bottom of the chamber, between the said two partitions and above the lower ends thereof, and a discharge-opening in the upper end of the casing, substantially as described.

10. A combustion-chamber comprising a casing provided with two downwardly-extending partitions, an air-inlet in the casing between the two said partitions, an upwardly-extending partition located between the two downwardly-extending partitions and extending from the bottom of the chamber above the lower ends of the said two partitions, and a discharge-opening in the upper end of the casing, the bottom of the chamber at one side of the upwardly-extending partition being perforated and imperforate upon the other side thereof, substantially as described.

11. A combustion-chamber provided with an inlet-opening for air in its upper end, a gas-discharge opening also in its upper end, a partition extending downwardly from the upper end of the chamber and located between the two said openings, and a partition extending from the bottom of the chamber upwardly above the lower end of the other partition and having its upper end adjacent to the air-inlet opening, substantially as described.

12. A combustion-chamber provided in its upper end with an air-inlet, a damper controlling the said air-inlet, two downwardly-extending partitions located one on each side of the said air-inlet, a partition extending upwardly from the bottom of the said chamber between the two said downwardly-extending partitions and above the lower ends thereof, and a discharge-opening at one side of one of the downwardly-extending partitions, substantially as described.

In testimony whereof I have signed my name to this specification in presence of two subscribing witnesses.

CHRISTIAN OLSTED.

Witnesses:
WARREN D. HOUSE,
C. A. CORCORAN.